(12) United States Patent
Fawcett et al.

(10) Patent No.: US 9,466,192 B2
(45) Date of Patent: *Oct. 11, 2016

(54) MERCHANDISE SECURITY DEVICE INCLUDING STRAIN RELIEF BLOCK

(71) Applicant: InVue Security Products Inc., Charlotte, NC (US)

(72) Inventors: Christopher J. Fawcett, Charlotte, NC (US); Gary Andrew Taylor, Fort Mill, SC (US); Robert O. Hartweg, Waxhaw, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,114

(22) Filed: Jul. 2, 2015

(65) Prior Publication Data

US 2015/0317887 A1    Nov. 5, 2015

Related U.S. Application Data

(63) Continuation of application No. 13/800,000, filed on Mar. 13, 2013, now Pat. No. 9,111,428.

(60) Provisional application No. 61/610,142, filed on Mar. 13, 2012.

(51) Int. Cl.
*G08B 13/12* (2006.01)
*G08B 13/14* (2006.01)
(Continued)

(52) U.S. Cl.
CPC ....... *G08B 13/1463* (2013.01); *G08B 13/1445* (2013.01); *G08B 13/1454* (2013.01); *H01R 13/5812* (2013.01); *H02G 15/007* (2013.01)

(58) Field of Classification Search
CPC .......... G08B 13/1445; G08B 13/1454; G08B 13/1463
USPC .................. 340/568.2, 568.3, 568.4
See application file for complete search history.

(56) References Cited

U.S. PATENT DOCUMENTS

| 4,029,896 A | 6/1977 | Skinner |
| 5,082,232 A | 1/1992 | Wilson |

(Continued)

FOREIGN PATENT DOCUMENTS

| DE | 19605052 A1 | 8/1997 |
| JP | 09330483 A | 12/1997 |

(Continued)

OTHER PUBLICATIONS

Mark Meister, Extended European Search Report for European Patent Application 13800279.5, Nov. 23, 2015, 9 pages, European Patent Office, Munich, Germany.

(Continued)

*Primary Examiner* — John A Tweel, Jr.
(74) *Attorney, Agent, or Firm* — InVue Security Products Inc.

(57) ABSTRACT

A merchandise security device for displaying an electronic item of merchandise includes a strain relief block configured for attachment to the merchandise and an alarming power cable configured for being electrically coupled to a power input port provided on the merchandise. The alarming power cable is routed through the strain relief block for reducing strain applied to the alarming power cable, which may prevent damaging the power input port or the portion of the alarming power cable extending between the strain relief block and the power input port.

20 Claims, 6 Drawing Sheets

(51) Int. Cl.
*H02G 15/007* (2006.01)
*H01R 13/58* (2006.01)

(56) References Cited

U.S. PATENT DOCUMENTS

| | | |
|---|---|---|
| 5,345,220 A | 9/1994 | Wachsman |
| 6,595,792 B1 | 7/2003 | Rudolph et al. |
| 6,621,415 B1 | 9/2003 | Willis |
| 7,592,548 B2 | 9/2009 | Marszalek et al. |
| 9,111,428 B2 * | 8/2015 | Fawcett e .......... G08B 13/1454 |
| 2002/0011547 A1 | 1/2002 | Gross et al. |
| 2005/0001485 A1 | 1/2005 | Pail |
| 2009/0079566 A1 | 3/2009 | Goldstein et al. |
| 2011/0187531 A1 | 8/2011 | Oehl et al. |
| 2012/0280810 A1 | 11/2012 | Wheeler |
| 2013/0241731 A1 | 9/2013 | Fawcett et al. |
| 2014/0062698 A1 | 3/2014 | Fawcett |
| 2014/0152441 A1 | 6/2014 | Tinti |

FOREIGN PATENT DOCUMENTS

| | | |
|---|---|---|
| KR | 200426002 Y1 | 9/2006 |
| KR | 1020090123334 A | 12/2009 |

OTHER PUBLICATIONS

J-Plug Lock Brochure available on website at www.multplx.com, 2012, 11 pages, Multplx Security, United Kingdom.

Chang Ho Lee, International Search Report and Written Opinion of the International Searching Authority for International Patent Application PCT/US2013/030817, Dec. 11, 2013, pp. 1-14, Korean Intellectual Property Office, Republic of Korea.

* cited by examiner

MERCHANDISE SECURITY DEVICE INCLUDING STRAIN RELIEF BLOCK

CROSS REFERENCE TO RELATED APPLICATIONS

This application is a continuation of U.S. application Ser. No. 13/800,000 filed on Mar. 13, 2013, which claims the benefit of priority of U.S. Provisional Application No. 61/610,142, filed on Mar. 13, 2012, each of which is hereby incorporated by reference in its entirety.

FIELD OF THE INVENTION

Embodiments of the present invention relate generally to merchandise display systems and merchandise security devices that provide power to an electronic item of merchandise. More particularly, embodiments of the present invention are directed to a merchandise security device including a strain relief block. In some embodiments, the strain relief block routes an alarming power cable of the merchandise security device to a power input port provided on an electronic item of merchandise for reducing strain on the alarming power cable.

BACKGROUND OF THE INVENTION

Retailers routinely display relatively small, portable electronic items of merchandise, such as mobile (e.g. cellular) telephones, media players, handheld game consoles, personal data assistants (PDAs), global positioning satellite (GPS) devices, handheld digital cameras and video recorders, tablet computers, e-readers and the like, for customers to examine before making a purchase. Retailers often desire the electronic item of merchandise to be powered so that the customer can operate the merchandise to evaluate its operating features. At the same time, retailers do not want the item of merchandise to be stolen or removed from the display area by an unauthorized person. Accordingly, retailers operably couple the electronic item of merchandise to a merchandise security device including a power cable that provides power to the merchandise.

Known merchandise security devices have included a sensor housing configured to be attached to a relatively flat surface of an electronic item of merchandise by a layer of an adhesive, such as double-sided tape. The sensor housing contains a sensor, for example a proximity switch, limit switch or the like, and sensor electronics for monitoring a secured (i.e. non-alarming) state of the sensor and an unsecured (i.e. alarming) state of the sensor. A power cord electrically couples the sensor housing to an external source of electrical power, and optionally, to an alarm module containing alarm electronics for activating an audible and/or visible alarm in response to an unsecured state of the sensor monitored by the sensor electronics. A separate power adapter cord extends between the sensor housing and a power input port provided the electronic item of merchandise to provide electrical power at an appropriate operating voltage for the merchandise. As required, voltage regulating and/or power management electronics are provided in the sensor housing or the alarm module for adjusting the voltage supplied by the external power source to the proper operating voltage for the electronic item of merchandise.

As will be readily appreciated by those skilled in the art, the sensor housing containing the sensor, sensor electronics, optional voltage regulating and/or power electronics as well as means for electrically connecting the power cable to the power adapter cord can be somewhat large in comparison to the dimensions of the electronic items of merchandise that retailers presently display on a merchandise security device. Furthermore, it is anticipated that the dimensions of the types of electronic items of merchandise typically displayed by retailers will become even smaller in the future. At the same time, retailers desire for customers to see more of the electronic item of merchandise being displayed and less of the merchandise security device. One approach to reducing the visibility of the merchandise security device is to remove the sensor and the sensor electronics from the sensor housing. Eliminating the sensor and the sensor electronics from the sensor housing can be accomplished by combining the power cable and the separate power adapter cord into a single alarming power cable that is operably coupled to an alarm module configured to activate an audible and/or visible alarm in the event that the alarming power cable is cut, severed or removed (i.e. unplugged from the power input port of the electronic item of merchandise).

An alarming power cable also obviates the need for any means for electrically connecting the power cable to the power adapter cord, as well as the need for the sensor housing itself. However, an alarming power cable introduces a disadvantage to the merchandise security device that was not previously encountered. Specifically, the strain applied to the alarming power cable when a customer extends the cable beyond its elastic length results in an unacceptable stress induced on the power input port of the electronic item of merchandise. The strain applied to the alarming power cable has the potential to not only damage the merchandise security device, but can also destroy the functionality of the power input port of the significantly more expensive electronic item of merchandise. In certain instances, a power cable having increased mechanical strength or an unpowered, high strength mechanical cable may be utilized in place of the alarming power cable. Regardless, the strain applied to the cable will result in a potentially damaging amount of stress induced on the connector port, jack, receptacle or the like.

Accordingly, it is apparent a need exists for managing the strain applied to an alarming power cable of a merchandise security device and the resulting stress induced on a power input port of an electronic item of merchandise. A further need exists for a merchandise security device including an alarming power cable and a means for managing strain applied to the alarming power cable. An additional need exists for a merchandise security device including an alarming power cable and a means for reducing or eliminating stress induced on a power input port of an electronic item of merchandise when strain is applied to the alarming power cable so as to minimize potential damage to the merchandise security device and the power input port of the merchandise.

BRIEF SUMMARY OF THE INVENTION

Embodiments of the present invention are directed to a merchandise security device for displaying and protecting an item of merchandise from theft. The security device comprises a cable having a connector at one end coupled to a connector port provided on the item of merchandise. The security device also includes a strain relief block configured for attachment to a surface of the item of merchandise. The strain relief block comprising a housing defining at least one channel formed therein for routing a portion of the cable through the strain relief block and to the connector port of the item of merchandise for reducing strain applied to the cable.

In another embodiment, a strain relief block for attachment to an item of merchandise being displayed by a merchandise security device and for relieving stress induced by strain applied to a cable coupled to the item of merchandise is provided. The strain relief block comprises a housing having a sidewall and defining an interior compartment. The interior compartment has at least one channel formed therein for routing the cable through the housing, and the sidewall has at least one pair of openings formed therein for receiving the cable to route the cable through the channel formed in the housing for reducing strain applied to the cable.

According to another embodiment, a merchandise security device for displaying and protecting an electronic item of merchandise having a power input port is provided. The security device comprises a strain relief block configured for attachment to a surface of the electronic item of merchandise. The security device further includes an alarming power cable routed through the strain relief block and extending between an external source of electrical power and the power input port. In addition, the security device includes an alarm module disposed along the alarming power cable between the external source of electrical power and the strain relief block. The alarming power cable comprises a plurality of conductors, wherein at least one of the conductors carries an electrical power signal between the external source of electrical power and the power input port and at least one of the conductors carries a security signal between the power input port and the alarm module. The strain relief block comprises a housing having a sidewall and defining an interior compartment, wherein the sidewall has at least a pair of openings for receiving the alarming power cable to route the alarming power cable through a channel formed in the interior compartment of the housing for reducing strain applied to the alarming power cable.

DETAILED DESCRIPTION OF EXEMPLARY EMBODIMENTS

Figure 1:
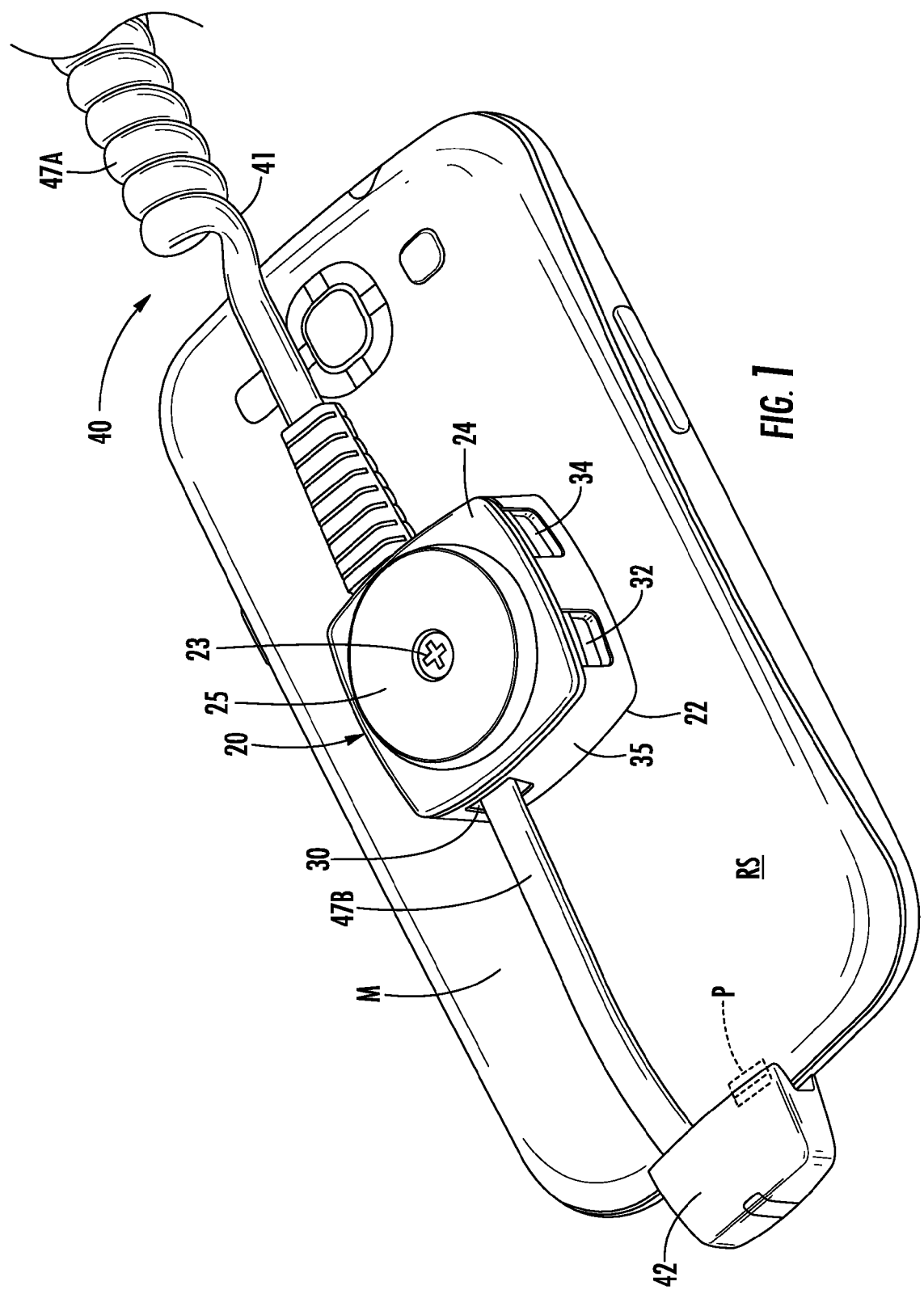
FIG. 1 is a rear perspective view showing an electronic item of merchandise having a power input port electrically coupled to an alarming power cable and mechanically coupled to one embodiment of a strain relief block.

The accompanying drawing figures, wherein like reference numerals denote like elements throughout the various views, illustrate embodiments of a merchandise security device including a strain relief block according to the invention. The merchandise security device further includes a power cable that electrically connects an electronic item of merchandise to an external source of electrical power. By way of example and not limitation, the electronic item of merchandise may be a relatively small, portable, battery-operated device, such as a mobile (e.g. cellular) telephone, media player, handheld game console, personal data assistant (PDA), global positioning satellite (GPS) device, handheld digital camera or video recorder, tablet computer, e-reader and the like, that requires electrical power for a potential purchaser to operate before making a decision whether to purchase the merchandise while the item is being displayed in a display area of a retail store and protected from theft by the merchandise security device.

Figure 2:
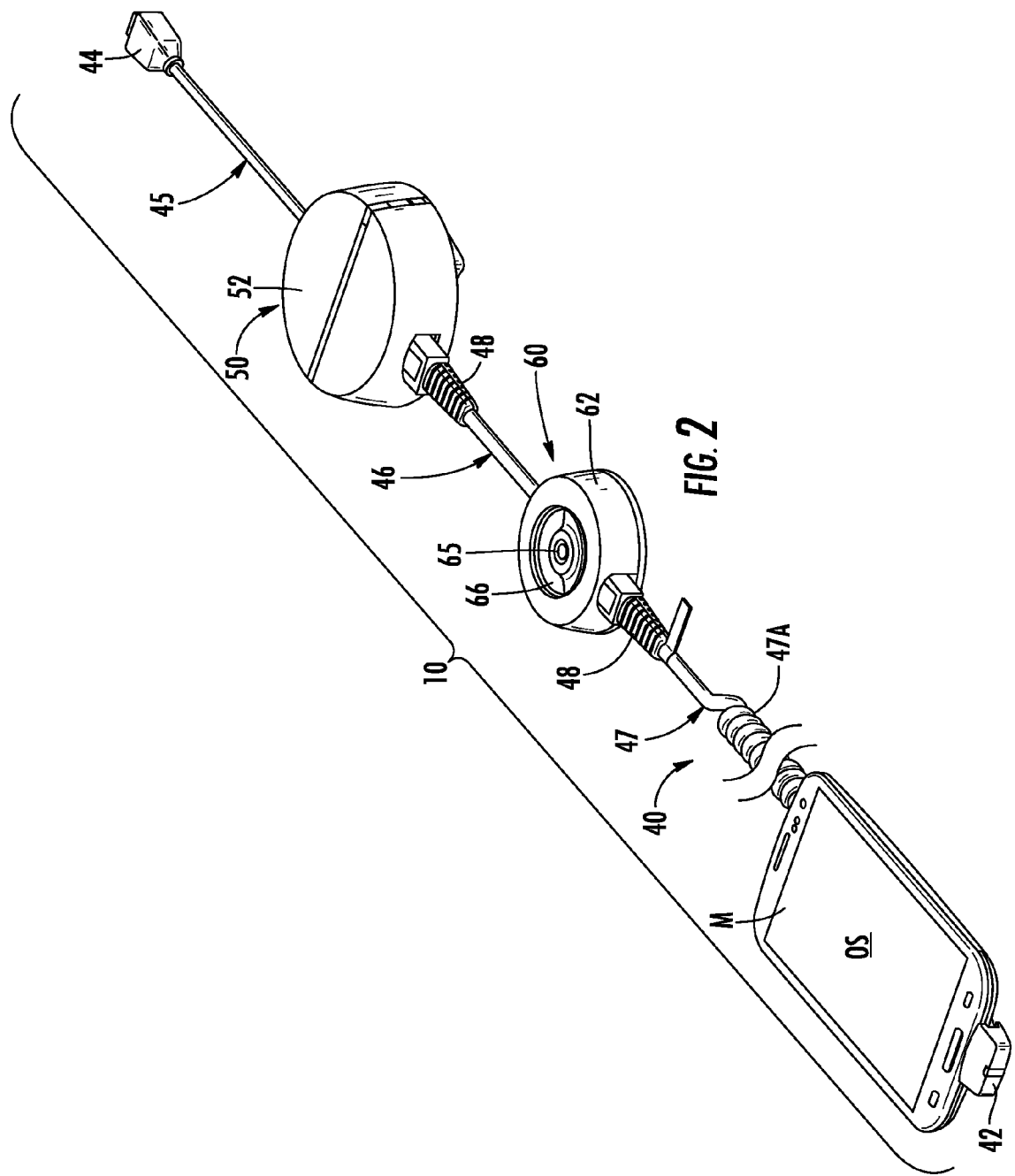
FIG. 2 is a front perspective view showing the electronic item of merchandise and one embodiment of a merchandise security device.
Figure 3:
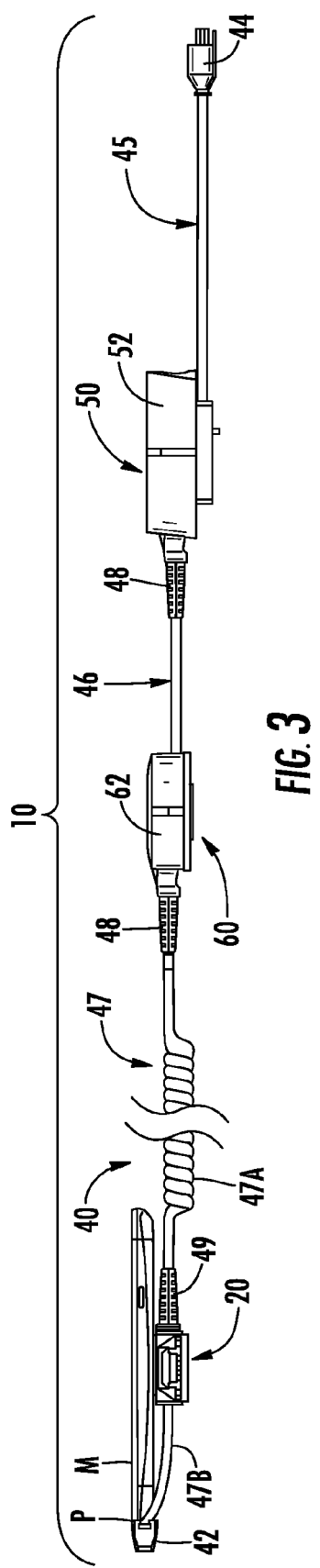
FIG. 3 is a side elevation view showing the electronic item of merchandise and the merchandise security device of FIG. 2.

In the exemplary embodiments of the invention shown and described herein, an electronic item of merchandise, indicated generally by reference character M, is mechanically and electrically coupled to a merchandise security device, indicated generally by reference character 10, as shown in FIG. 2 and FIG. 3. The merchandise security device 10 comprises a strain relief block, indicated generally by reference character 20, and an alarming power cable, indicated generally by reference character 40. As shown, the item of merchandise M may have a relatively flat rear surface RS that is attached to the strain relief block 20 in a conventional manner, for example by a relatively thin layer of a pressure sensitive adhesive (PSA), such as double-sided tape. The dimensions of the strain relief block 20 may be significantly smaller than the dimensions of the item of merchandise M so that the footprint of the strain relief block is relatively small compared to the footprint of the rear surface RS of the item of merchandise. As a result, the presence of the strain relief block 20 on the rear surface RS of the item of merchandise M is less noticeable to the potential purchaser. However, the strain relief block 20 may be affixed to a more conspicuous surface of the item of merchandise M as desired by the retailer, or alternatively, as required by the geometry of the merchandise. One skilled in the merchandise security art will readily understand and appreciate that the strain relief block 20 may take the place of a conventional sensor housing, mounting member, retaining element or the like, that typically contains a sensor, sensor electronics and optional voltage regulating and/or power management electronics, as well as means for electrically connecting a conventional power cable to a conventional power adapter cord. Thus, the strain relief block 20 may eliminate the sensor (e.g. proximity switch, limit switch, etc.) and the sensor electronics.

The optional voltage and/or power management electronics, as well as the means for electrically connecting the power cable with the power adapter cord, may likewise be eliminated by combining the conventional power cable and the conventional power adapter cord into a single, continuous alarming power cable 40. Alarming power cable 40 electrically connects the electronic item of merchandise M to the external source of electrical power and activates an audible and/or visible alarm in the event that the cable is cut, severed or removed (i.e. unplugged) from the electronic item of merchandise M. As such, alarming power cable 40 may comprise a plurality of conductors disposed within a protective outer sheath 41 in a conventional manner. At least one of the conductors conducts an electrical power signal between the external source of electrical power and a power input port P provided on the electronic item of merchandise M. At least one of the conductors conducts a security signal between the power input port P and an alarm module, indicated generally by reference character 50, which activates an alarm in the event that the electrical signal is interrupted in one of the aforementioned manners indicating a possible theft condition. As will be understood and appreciated, alarming power cable alternatively may be a mechanical security cable, for example a high strength, cut resistant cable, with or without a security signal conductor in the event that the displayed item of merchandise does not require electrical power or obtains electrical power from another power cable. Likewise, the alarming power cable may alternatively be a power cable that provides electrical power to the electronic item of merchandise without a security signal conductor in the event that the mechanical security provided by the electro-mechanical power cable is sufficient for protecting the item of merchandise from theft.

FIG. 1 shows an exemplary embodiment of a strain relief block 20 according to the invention affixed to the rear surface RS of the electronic item of merchandise M with an alarming power cable 40 routed through the strain relief block to the power input port P provided on the merchandise. The strain relief block 20 comprises a generally hollow housing 22 defining an interior compartment 21 (FIG. 5 and FIG. 6) for routing the alarming power cable 40 in a manner to be described hereinafter. The electronic item of merchandise M is shown in the exemplary embodiments herein as a mobile (e.g. cellular) telephone, for example a Smartphone, having the power input port P located on one end. The alarming power cable 40 terminates with a connector 42 at the power input port P of the Smartphone M. The connector 42 and alarming power cable 40 are configured such that the male connector element 43 (FIG. 4) that engages the female connector element disposed within the power input port P extends outwardly from the connector in the direction of the alarming power cable. As a result, the alarming power cable 40 is substantially concealed beneath the electronic item of merchandise M while a potential purchaser examines the operating surface OS on the opposite (i.e. front) surface of the merchandise. A connector and power adapter cord configured in this manner is shown and described in greater detail in co-pending U.S. application Ser. No. 13/711,740 entitled POWER ADAPTER CORD INCLUDING ROTATABLE CONNECTOR filed on Dec. 12, 2012, and assigned to the assignee of the present application, the entire disclosure of which is incorporated herein by reference. As will be described hereinafter, a portion of the alarming power cable 40 is routed through the interior compartment 21 of the strain relief block 20 to alleviate stress induced on the female connector element disposed within the power input port P provided on the electronic item of merchandise M.

FIG. 2 and FIG. 3 show an exemplary embodiment of a merchandise security device 10 according to the invention. As shown herein, the merchandise security device 10 comprises a strain relief block 20 configured for attachment to an electronic item of merchandise M, an alarming power cable 40 extending between an external source of electrical power (not shown) and the electronic item of merchandise, an alarm module 50 for activating an audible and/or visible alarm in response to a possible theft condition, and a mounting member 60 for supporting the strain relief block. As previously described, the strain relief block 20 is attached to a rear surface RS of the electronic item of merchandise M and comprises a generally hollow housing 22 for routing the alarming power cable 40 through the strain relief block to the power input port P provided on the electronic item of merchandise. The alarming power cable 40 may comprise a plurality of conductors (not shown) contained within a protective outer sheath 41 in a conventional manner. As previously mentioned, the plurality of conductors comprises at least one conductor for carrying an electrical power signal between the external source of electrical power and the power input port P of the electronic item of merchandise M, and at least one conductor for carrying a security signal between the power input port and the alarm module 50.

A connector 42 having a male connector element 43, for example a micro USB connector, is disposed at one end of the alarming power cable 40. A plug 44, for example an AC power plug, is disposed at the other end of the alarming power cable 40 for electrically connecting the alarming power cable to the external source of electrical power, for example a conventional 110V AC power outlet. The alarming power cable 40 further comprises a section 45 extending between the plug 44 and the alarm module 50, a section 46 extending between the alarm module 50 and the mounting member 60, and a section 47 extending between the mounting member 60 and the electronic item of merchandise M. A bend relief sheath and/or connector 48 may be provided on the alarming power cable 40 adjacent the alarm module 50 and/or the mounting member 60. A bend relief sheath 49 may be slidably disposed on the section 47 of the alarming power cable 40 adjacent the strain relief block 20.

For purposes of illustration, the electronic item of merchandise M may be provided with a power input port P configured as a standard micro-USB jack. Accordingly, the alarming power cable 40 may have a compatible micro-USB plug on the end configured to mate with the standard micro-USB jack of the power input port P provided on the item of merchandise M. A standard micro-USB jack and standard micro-USB plug connection typically has a slight interference fit. As such, a limited amount of force is required to engage the plug with the jack and to thereafter remove (i.e. extract) the plug from the jack. Unfortunately, the slight interference fit may be insufficient to prevent a legitimate customer from inadvertently detaching the alarming power cable 40 from the item of merchandise M and causing a "false" alarm of the merchandise security device. Likewise, the slight interference fit is not sufficient to prevent a shoplifter from detaching the alarming power cable 40 without damaging the power input port P of the item of merchandise M. Other conventional connections between the power input port P and the alarming power cable 40 may also have such limitations. As noted above, the strain relief block 20 is configured to alleviate stress induced on the connector element of the power input port P provided on the electronic item of merchandise M. Moreover, provided sufficient tension is applied on the alarming power cable 40 between the power input port P and the strain relief block 20, the strain relief block may also be configured to reduce false alarms by making it more difficult to detach the alarming power cable from the power input port.

In the exemplary embodiment of the merchandise security device 10 illustrated in FIG. 2 and FIG. 3, the alarm module 50 is shown disposed between the plug 44 and the mounting member 60. Alarm module 50 preferably comprises a housing 52 that is positioned in a secure location, for example underneath a display counter or within a locked cabinet, so that the alarm module is not readily accessible to unauthorized persons. Housing 52 is generally hollow and defines an interior compartment configured to contain alarm electronics (not shown) for monitoring the state of the security signal conducted by the alarming power cable 40 and for activating an internal or remote audible and/or visible alarm in the event of a possible theft condition in a known manner. Housing 52 may optionally contain voltage regulating and/or power management electronics for modulating the voltage (e.g. 18V) of the external source of electrical power to provide an appropriate operating voltage (e.g. 5V) to the electronic item of merchandise M in a known manner.

In the exemplary embodiment of the merchandise security device 10 illustrated in FIG. 2 and FIG. 3, the mounting member 60 is shown disposed between the alarm module 50 and the strain relief block 20. Mounting member 60 comprises a housing 62 that may be positioned in an accessible location, for example on the surface of a display counter, so that the strain relief block 20 may be removably supported on the mounting member in an aesthetic display of the electronic item of merchandise M. Various techniques may be used to support or nest the strain relief block 20 on the mounting member 60 so that the item of merchandise M may be temporarily positioned. As best shown in FIG. 1, a magnetic element 25 may project outwardly from the bottom surface of the housing 22 of the strain relief block 20. Magnetic element 25 is configured to engage a cooperating magnetic element 65 disposed within a recess 66 formed on the top surface of the housing 62 of the mounting member 60. If desired, the magnetic element 25 projecting from the strain relief block 20 and the recess 66 formed in the mounting member 60 may have complementary non-symmetrical shapes so that the electronic item of merchandise M is positioned in a predetermined orientation when the strain relief block 20 is removably supported on the mounting member 60. If desired, the housing 62 of the mounting member 60 may alternatively contain the alarm electronics and the optional voltage regulating and/or power management electronics so that the alarm module 50 may be eliminated.

Figure 4:
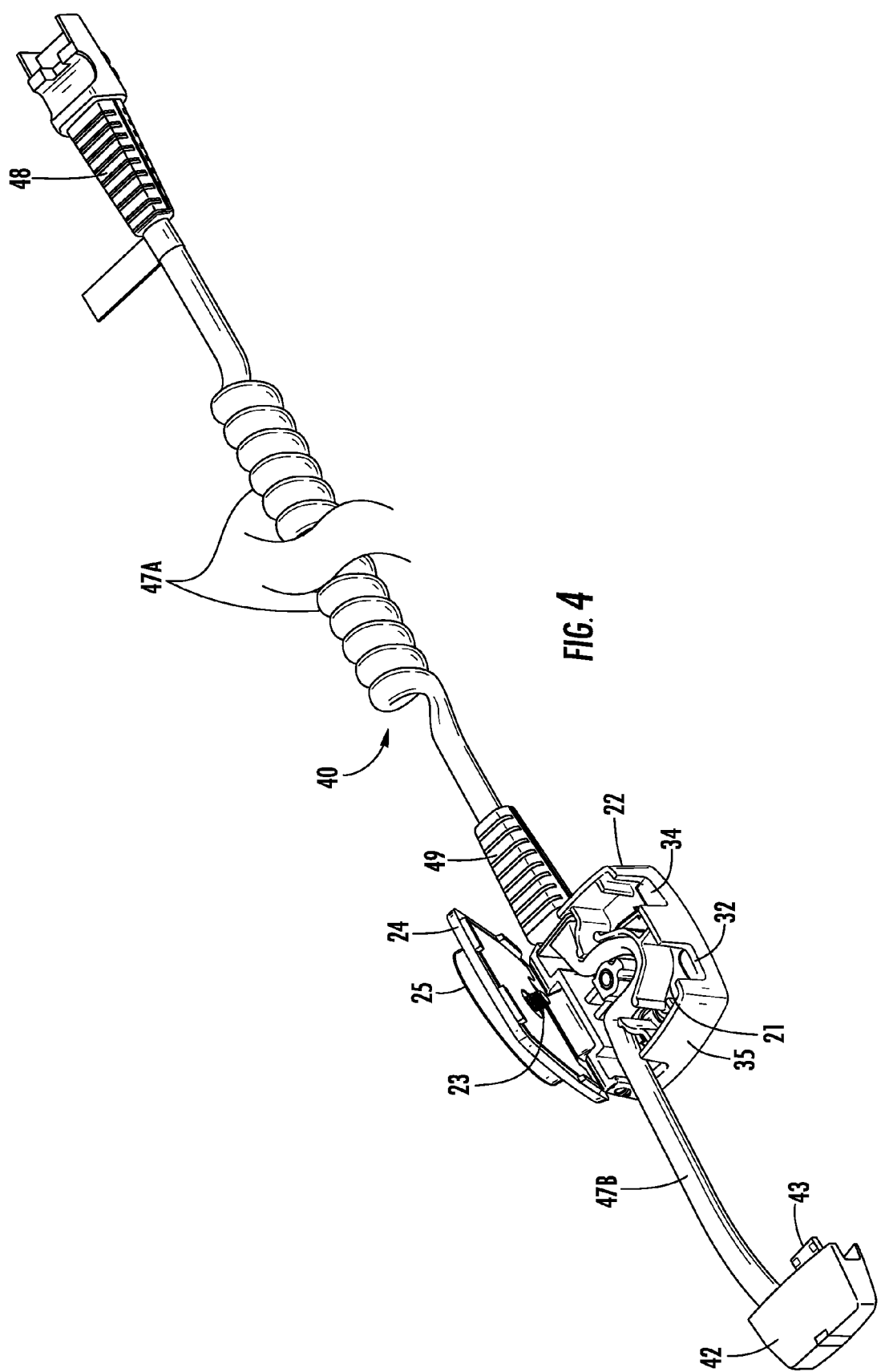
FIG. 4 is a perspective view of the embodiment of the strain relief block and a section of the alarming power cable of FIG. 1 shown with a cover of the strain relief block opened and with the electronic item of merchandise removed for purposes of clarity.
Figure 5:
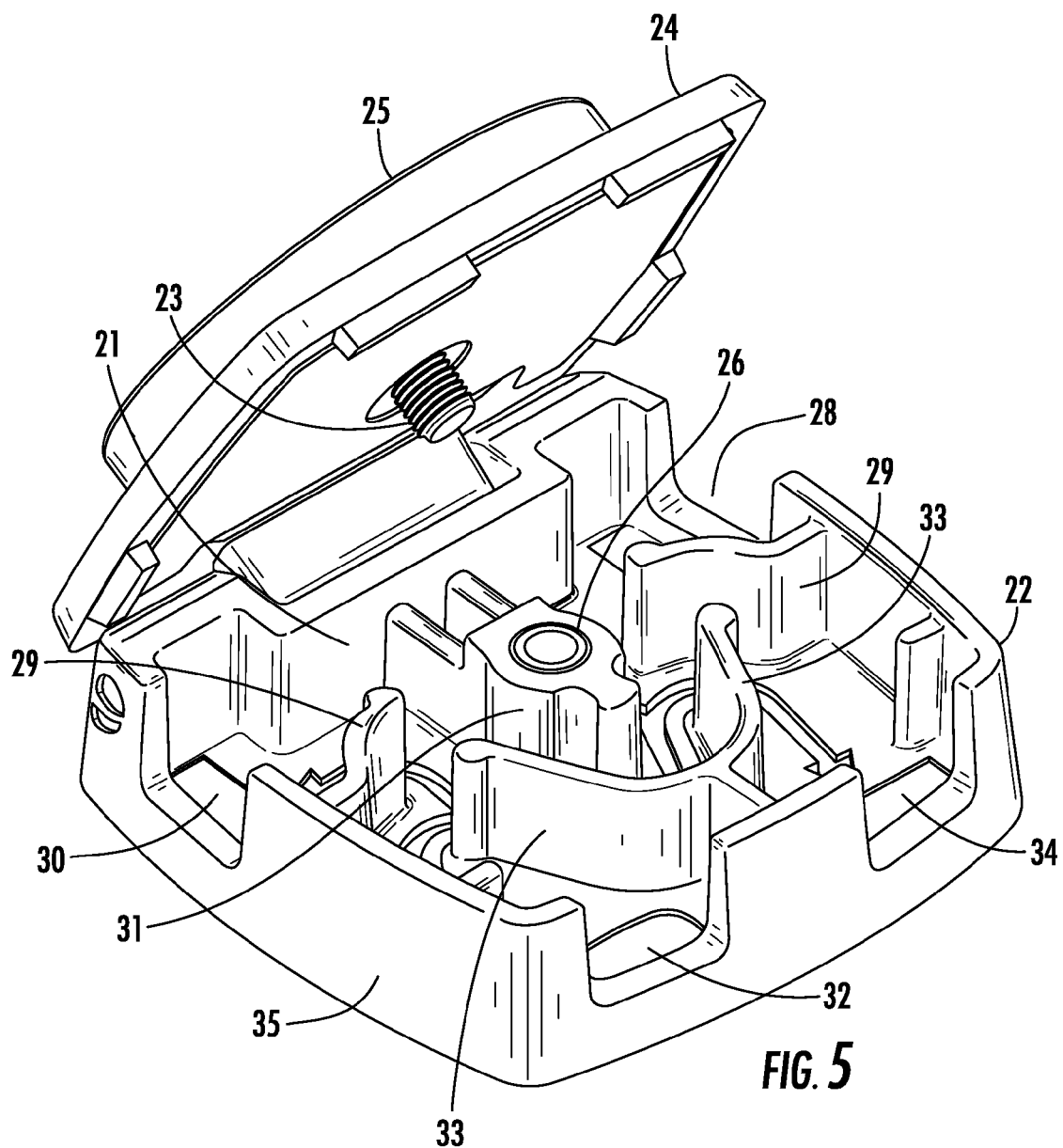
FIG. 5 is an enlarged perspective view of the strain relief block shown in FIG. 4.
Figure 6:
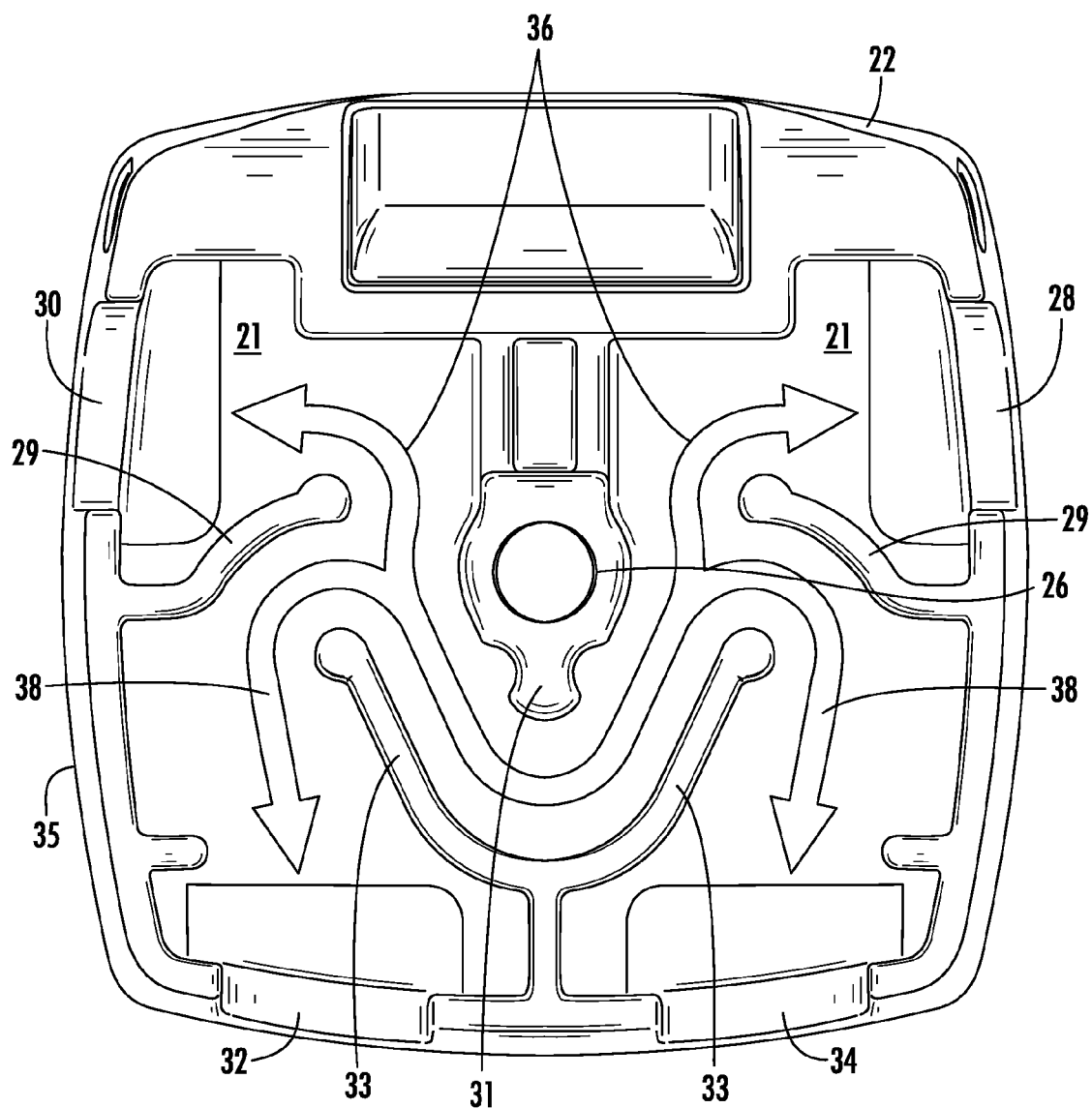
FIG. 6 is an enlarged plan view of the strain relief block shown in FIG. 5 with the cover removed for purposes of clarity.

FIG. 4 shows an embodiment of the strain relief block 20 and the section 47 of the alarming power cable in greater detail. FIG. 5 and FIG. 6 show the interior compartment 21 of the strain relief block 20 in greater detail. As previously mentioned, and illustrated in FIG. 4, the strain relief block 20 is configured to route the section 47 of the alarming power cable 40 through the strain relief block and to the power input port P of the electronic item of merchandise M. More specifically, the strain relief block 20 is operable for relieving strain applied to the alarming power cable 40 when a potential purchaser extends the cable beyond its usable elastic length. By relieving the strain in the alarming power cable 40 at the strain relief block 20, stress induced by the strain in the cable is transferred to the strain relief block instead of to the portion of the alarming power cable that extends between the strain relief block and the power input port P of the electronic item of merchandise M or to the power input port P. Accordingly, strain relief block 20 reduces, and may even prevent, stress induced by strain in the alarming power cable 40 from damaging the portion of the alarming power cable 40 between the strain relief block and the power input port P of the electronic item of merchandise M, and/or the power input port of the electronic item of merchandise, such as the female connector element disposed within the power input port.

As shown in FIG. 4, the section 47 of the alarming power cable may have a helical coil portion 47A for extending and retracting the length of the cable, and a straight portion 47B for routing through the strain relief block 20 to the power input port P of the electronic item of merchandise M. The helical coil portion 47A of the alarming power cable 40 extends the length of the cable to its usable elastic length under the influence of an extension force and subsequently retract the length of the cable to its relaxed length when the extension force is released. The bend relief sheath 49 may be slidably disposed on the straight portion 47B of the section 47 of the alarming power cable 40 so that the appropriate length of the straight portion is routed through the strain relief block 20 and extends between the strain relief block and the power input port P on the electronic item of merchandise M. Thus, the appropriate length of the straight portion 47B may vary and depends on the dimensions of the specific item of merchandise displayed by the merchandise security device 10. As such, the merchandise security device 10 is adjustable to accommodate electronic items of merchandise M having various dimensions without introducing slack in the straight portion 47B of the alarming power cable 40 that may detract from the aesthetic presentation of the merchandise display.

As best shown in FIG. 5, the housing 22 of the strain relief block 20 is provided with a cover 24 movably disposed on the housing, for example by a hinge. The cover 24 may be secured to the housing 22 in a closed position, such as, for example, by a threaded security fastener 23 that extends through the magnetic portion 25 disposed on the cover to engage an internally threaded recess 26 within the interior compartment 21 defined by the housing of the strain relief block 20. The cover 24 is movably disposed on the housing 22 so that the straight portion 47B of the alarming power cable 40 can be routed through the interior compartment 21 of the housing. Housing 22 of strain relief block 20 further comprises a first pair of openings 28, 30 and a second pair of openings 32, 34 formed in a sidewall 35 of the housing. Housing 22 includes one or more ribs 29, 31, 33 that are configured to route the alarming power cable 40 through the strain relief block 20. The ribs 29, 31, 33 may each define a raised surface for routing the alarming power cable 40 through the housing 22. One or more of the ribs 29, 31, 33 may define one or more non-linear channels through the strain relief block 20 to facilitate routing of the alarming power cable 40. Thus, once positioned within the housing 20, the alarming power cable 40 follows a non-linear path via the non-linear channels. The non-linear channels may be sized and configured such that the alarming power cable 40 is received therein (see e.g. FIG. 4), such as in a press fit or interference fit.

The openings 28, 30 formed in the sidewall 35 permit the straight portion 47B of the alarming power cable 40 to enter the housing 22 of the strain relief block 20 and to exit the housing after traversing about ribs 29 and rib 31. Depending on the size of the alarming power cable 40, the power cable may also traverse or otherwise engage ribs 33. In this manner, the straight portion 47B of the alarming power cable 40 enters and exits the strain relief block 20 in the same direction (e.g. along the same axis) as shown in FIG. 1 and FIG. 4 to route the cable through a first non-linear channel formed in the interior compartment of the housing indicated by the "U" shaped arrows 36 in FIG. 6. Alternatively, the openings 32, 34 formed in the sidewall 35 permit the straight portion 47B of the alarming power cable 40 to enter the housing 22 of the strain relief block 20 and to exit the housing after traversing ribs 33 and rib 31. Depending on the size of the alarming power cable 40, the power cable may also traverse or otherwise engage ribs 29. In this manner, the straight portion 47B of the alarming power cable 40 enters and exits the strain relief block 20 in opposite directions (e.g. portions parallel to one another) to route the cable through a second non-linear channel formed in the interior compartment of the housing indicated by the "M" shaped arrows 38 in FIG. 6. In an alternative exemplary embodiment, the cover 24 of the strain relief block 20 may be eliminated. In that embodiment, the alarming power cable 40 is routed through the first non-linear channel 36 or the second non-linear channel 38 of the housing 22 and the connector 42 is coupled to the power input port P of the electronic item of merchandise M. The housing 22 is then inverted and attached to the rear surface RS of the electronic item of merchandise M so that the alarming power cable 40 is entrapped between the housing and the merchandise with the appropriate length of the straight portion 47B of the alarming power cable extending between the strain relief block 40 and the power input port P of the electronic item of merchandise M.

The foregoing has described one or more exemplary embodiments of a merchandise security device including a strain relief block for routing an alarming power cord between an external source of electrical power and a power input port provided on an electronic item of merchandise. The strain relief block operates to relieve the strain applied to the alarming power cable when the cable is extended beyond its usable elastic length. The strain relief block may reduce or prevent stress induced by the strain in the cable from damaging the alarming power cable or the power input port of the electronic item of merchandise, such as, for example, the female connector element within the power input port. Exemplary embodiments of a merchandise security device and a strain relief block according to the invention have been shown and described herein for purposes of illustrating and enabling the best mode of the invention. Those of ordinary skill in the art, however, will readily understand and appreciate that numerous variations and modifications of the invention may be made without departing from the spirit and scope of the invention. Accordingly, all such variations and modifications are intended to be encompassed by the appended claims.

That which is claimed is:

1. A merchandise security device for displaying and protecting an item of merchandise from theft, comprising:
   a strain relief block configured for attachment to the item of merchandise, the strain relief block comprising a housing defining at least one channel formed therein;
   a cable comprising a connector configured to engage a connector port provided on the item of merchandise and at least one conductor, a portion of the cable configured to be routed through the strain relief block and to the connector port of the item of merchandise for reducing strain applied to the cable; and
   an alarm module in communication with the at least one conductor, the at least one conductor configured to carry a security signal between the item of merchandise and the alarm module.

2. The merchandise security device of claim 1, wherein the housing has a sidewall and defines an interior compartment, the sidewall having at least a pair of openings for receiving and routing the portion of the cable through a channel formed in the interior compartment of the housing.

3. The merchandise security device of claim 2, wherein portion of the cable is configured to enter one of the pair of openings and exit through the other of the pair of openings.

4. The merchandise security device of claim 2, wherein the sidewall has a first pair of openings formed therein for receiving and routing the portion of the cable through the strain relief block and a second pair of openings formed therein for receiving and routing the portion of the cable through the strain relief block.

5. The merchandise security device of claim 1, wherein the cable comprises a plurality of conductors, at least one of the conductors configured to carry an electrical power signal between an external source of electrical power and the item of merchandise.

6. The merchandise security device of claim 1, wherein the portion of the cable extends entirely through the strain relief block.

7. The merchandise security device of claim 1, wherein a length of the cable between the connector and the strain relief block is adjustable based on a location of the portion of the cable routed through the strain relief block.

8. The merchandise security device of claim 1, wherein the cable is a power cable, and wherein the item of merchandise is a battery-operated, electronic item of merchandise and the connector port is a power input port provided on the electronic item of merchandise.

9. The merchandise security device of claim 1, wherein the alarm module is configured to monitor the security signal and to activate an alarm in the event that the security signal between the connector port and the alarm module is interrupted.

10. The merchandise security device of claim 1, wherein the at least one channel is non-linear.

11. The merchandise security device of claim 1, wherein the strain relief block further comprises a cover movably attached to the housing for securing the portion of the cable within the housing.

12. The merchandise security device of claim 11, wherein the cover is hingedly attached to the housing.

13. The merchandise security device of claim 1, further comprising a mounting member configured to removably support the strain relief block thereon for displaying the item of merchandise.

14. The merchandise security device of claim 1, wherein the strain relief block does not contain sensor electronics.

15. A merchandise security device for displaying and protecting an item of merchandise from theft, comprising:
   a cable having a connector at one end configured to engage a connector port provided on the item of merchandise; and
   a strain relief block configured for attachment to the item of merchandise, the strain relief block defining at least one channel formed therein for routing a portion of the cable through the strain relief block and to the connector port of the item of merchandise for reducing strain applied to the cable,
   wherein a length of the cable between the connector and the strain relief block is adjustable based on a location of the portion of the cable routed through the strain relief block.

16. A method for displaying and protecting an item of merchandise from theft, comprising:
   attaching a strain relief block to the item of merchandise, the strain relief block comprising a housing defining at least one channel formed therein;
   routing a portion of the cable through the strain relief block for reducing strain applied to the cable; and
   engaging a connector at an end of the cable with a connector port of the item of merchandise.

17. The method of claim 16, further comprising adjusting a length of the cable between the connector and the strain relief block.

18. The method of claim 16, further comprising connecting the cable to an alarm module, the alarm module configured to monitor a security signal carried by the cable and to activate an alarm in the event that the security signal between the connector port and the alarm module is interrupted.

19. The method of claim 16, further comprising positioning the strain relief block on a mounting member for displaying the item of merchandise.

20. The method of claim 16, further comprising closing a cover attached to the housing for securing the portion of the cable within the housing.

* * * * *